No. 779,099.

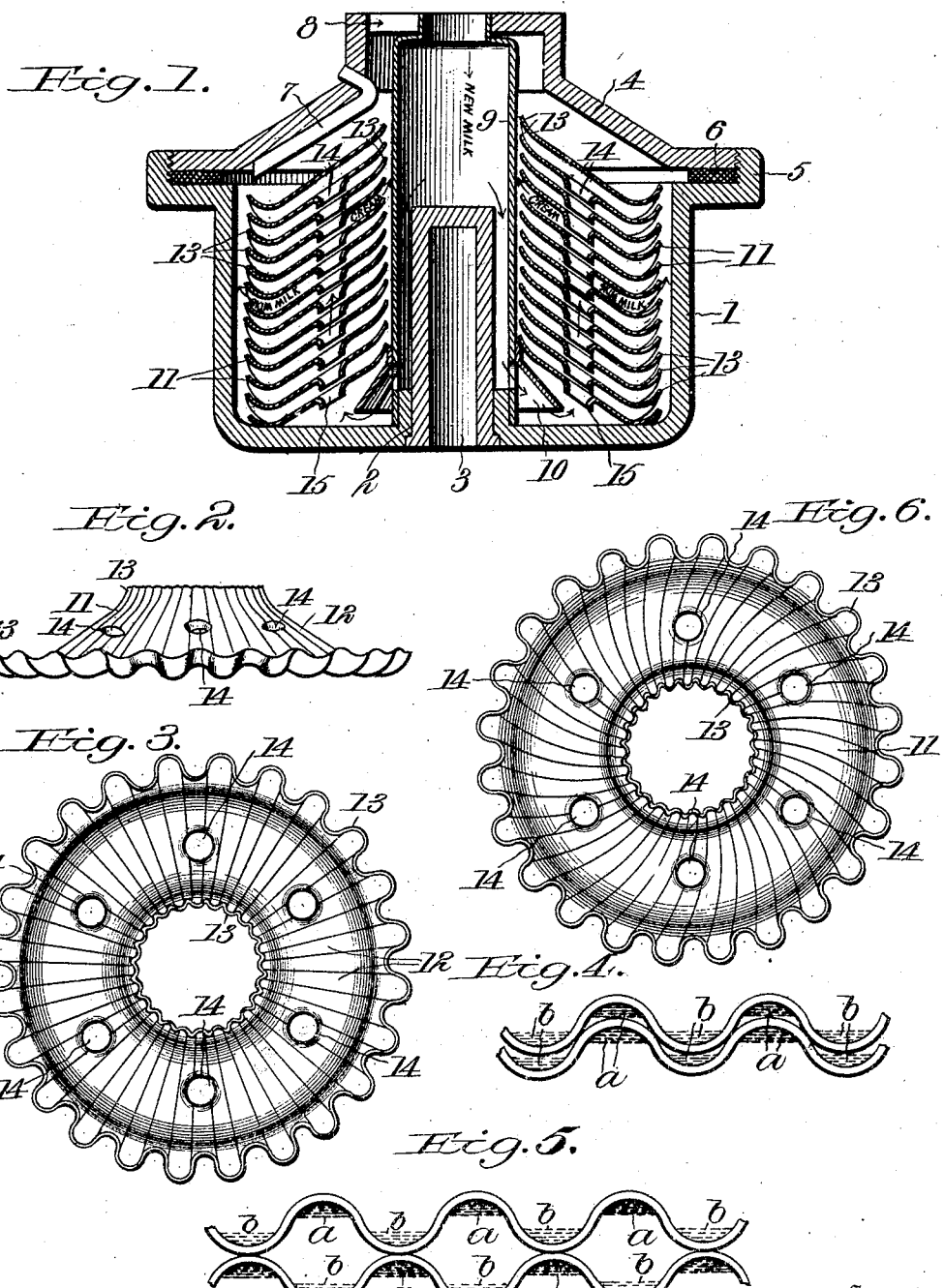

Patented January 3, 1905.

UNITED STATES PATENT OFFICE.

GUSTAF T. RENNERFELT, OF BROOKLYN, NEW YORK.

CENTRIFUGAL CREAM-SEPARATOR.

SPECIFICATION forming part of Letters Patent No. 779,099, dated January 3, 1905.

Application filed July 20, 1903. Serial No. 166,232.

*To all whom it may concern:*

Be it known that I, GUSTAF T. RENNERFELT, a subject of the King of Sweden and Norway, residing at Brooklyn, in the county of Kings and State of New York, have invented new and useful Improvements in Centrifugal Cream-Separators, of which the following is a specification.

This invention relates to improvements in centrifugal separators, and more especially to those employed for separating milk into cream and skim-milk, and has for its object to provide an improved form of ring or disk used to laminate the liquid in the bowl, the ring being usually arranged across the radial lines of the latter.

In the operation of a centrifugal cream-separator the whole milk is first introduced into the bowl or drum, and by the action of centrifugal force the heavy liquid or skim-milk has a tendency to hug the inner periphery of the bowl, while the lighter liquid or cream is displaced by the heavy liquid in its outward movement and caused to flow inward toward the axis of the bowl. In dealing with the subject of centrifugal separation the laws which govern hydraulics are to be considered, it being a well-known fact that the bulk of the liquid is traversed by currents in several directions and that these currents not only move radially in the bowl, but also axially and laterally or circumferentially.

It is the object of the present invention to provide means whereby the exact course of the useful currents will be assisted, so that the separating properties of the separator are enhanced and the operation expedited.

A further object of the invention is to prevent a lateral disturbance and eddies in the currents in the several layers of the body of the liquid; and with these objects in view the invention consists in the novel construction and arrangement of the separating-disks of the plates.

The invention is illustrated in the accompanying drawings, wherein—

Figure 1 is a vertical section of the bowl of the cream-separator with my improved separating-plates arranged therein. Fig. 2 is a side elevation of one of the plates. Fig. 3 is a top plan view of the same. Fig. 4 is a diagram showing the peripheral edges of several superposed plates and the layers of liquid in the corrugations thereof. Fig. 5 is a view similar to Fig. 4, showing a different arrangement of the plates with relation to each other; and Fig. 6 is a plan view of a plate with the corrugations arranged spirally.

In carrying out the invention, the bowl or drum employed may be of any shape, as my improved plates are applicable to bowls of different types, but the preferred embodiment is shown in the drawings in Fig. 1, wherein 1 designates the bowl or drum having a flanged opening 2 in the bottom thereof and provided with a central hollow boss 3, in which is fitted the supporting and balancing mechanism. (Not shown.) The bowl is provided with an upwardly-tapering cone-shaped cover 4, which screws onto the annular offset flange 5 at the top of the bowl, and a suitable packing 6 may be interposed between the contiguous faces of the flange and the cover. The cover is provided on its inner side with skim-milk tubes or passages 7, which at their lower ends terminate short of the inner periphery of the bowl, and their upper ends are directed outwardly through the cover to discharge the skim-milk onto a suitable tray, which may be supported on a suitable casing surrounding the bowl in the usual way. The top of the cover is formed with openings 8, through which the cream is discharged, and a central opening is provided in the top of the cover. Fitted in this opening and extending into engagement with the flange-tube on the bottom of the bowl is a cylindrical casing 9, into which the whole milk is introduced and permitted to pass down through openings formed in the lower end thereof, so that the whole milk is conveyed to the bottom of the bowl before being influenced by the centrifugal action, and for this purpose there is provided a flaring ring 10 on the lower end of the cylinder, the lower edge of the ring terminating short of the bottom of the bowl to permit the milk to flow into the space occupied by the rings, as shown by the arrows in Fig. 1.

11 represents the division plates or rings, which are arranged one above the other in the annular space between the cylinder and the vertical walls of the bowl and extending from the bottom to the cover, so that the liquid is divided into layers.

My improved form of division-plates is such as to assist the useful currents in their flow through the body of the liquid, and it may be stated that as the heavy particles of the milk flow outward toward the inner periphery of the bowl and the lighter particles toward the axis thereof and both currents moving axially at the same time there are created eddies or closed currents which are apt to circulate in vertical as well as horizontal planes, and owing to the unsymmetric location for the outlets for the skim-milk and cream a lateral disturbance will occur in the currents in the several layers of the liquid. To obviate these difficulties and increase the separating capacity of the separator, the plates or disks are made in the shape of a truncated cone and each division plate or ring is corrugated, as at 12, so that the laminations extend both axially and radially. The opposite edges are turned upwardly, as at 13, and merge gradually from the body portion thereof, which produces an approximate concavo-convex plate or ring to conform to the direction of the currents in flowing in the opposite directions, which, as before stated, is both radially and axially. By this construction of the disk the useful currents will be assisted and the eddies in vertical as well as horizontal planes will be stopped or broken up. Each disk also has a plurality of openings 14, spaced apart therearound and at a point intermediate the edges thereof, and the edges of these openings are bent downwardly, as at 15, such downwardly-bent portion merging gradually in a curve from the flat or corrugated surface of the plate. The upper plate is preferably imperforate and acts as a baffle-plate to divide the currents and prevent the skim-milk and cream getting mixed at the top of the bowl.

The disks are arranged one above the other within the bowl and preferably held in place by engaging one with the other in the manner shown in Fig. 4, although they may be arranged as shown in Fig. 5. When thus assembled, the outwardly-flowing heavy liquid or skim-milk is received in the channels of the corrugations in the lower side of the plate, as shown at $a$ in Figs. 4 and 5, while the light liquid or cream, which flows inwardly, is received in the channels formed in the upper side of the plate, as shown at $b$ in Figs. 4 and 5. By this arrangement of assembling the plates with the channels of one plate separated from those of another plate a lateral disturbance in the currents is prevented. These corrugations or channels are preferably arranged radially; but they may be arranged obliquely or spirally, as represented in Fig. 6.

The whole milk passes down the cylindrical casing 9 and enters the apertures 14 in the plates or rings, and when separation takes place there will be currents flowing in opposite directions across the radial lines of the bowl, and, as stated, the heavy liquid will move outwardly into the channels on the lower sides of the plates and upwardly in a direction to conform to the upwardly-bent edges of the latter, while the lighter liquid will flow inward into corrugations or channels on the upper side of the plates and pass upwardly in a direction corresponding to the upwardly-bent edges of the inner periphery of the plates and finally escape through the opening 8 in the cover. The oppositely bent or curved edges being directed upwardly, materially assist the oppositely-flowing radial currents in their upward course, since the curvature gradually merges from the body portion of the plate as distinguished from angular bends, which form obstructions to the path of the currents.

The above-mentioned corrugations will also serve the purpose of keeping the disks a proper distance apart. Special distance blocks or ribs may also be used for said purpose in the usual manner, if it is so desired.

Having thus described my invention, what I claim, and desire to secure by Letters Patent, is—

1. In a centrifugal separator, the combination with the bowl, of superposed division-plates arranged in the liquid-space across the radial lines of the bowl and having their inner and outer edges curved upwardly.

2. In a centrifugal separator, the combination with the bowl, of superposed division-plates arranged in the liquid-space across the radial lines of the bowl, each plate having a central opening and both edges of the plates being disposed parallel to the axis of the bowl and both in the same direction.

3. In a centrifugal separator, the combination with the bowl, of superposed concentric division-plates arranged in the liquid-space of the bowl, each plate being shaped to extend radially across the bowl with its inner and outer edges curved upwardly toward the axial lines of the bowl.

4. A division-plate for centrifugal separators consisting of a concentric ring provided with radial corrugations and having each edge bent upwardly.

5. A division-plate for centrifugal separators having a shape substantially that of a truncated cone, the inner and outer edges of which are curved upwardly.

6. A division-plate for centrifugal separators comprising a truncated, corrugated cone, both edges of which curve gradually from the body portion and extend upwardly.

7. A division-plate for centrifugal separators, comprising a truncated cone provided with apertures and having its inner and outer edges bent upwardly.

8. A division-plate for centrifugal separators comprising a truncated, corrugated cone provided with upwardly-curved edges and apertures intermediate the curved edges, said apertures being formed with downwardly-converging edges.

9. The combination with the bowl, of means in the bowl to laminate the liquid therein, comprising superposed division-plates constructed and arranged to establish opposite radial flowing currents therebetween, said plates having means for directing each of said currents upwardly from opposite edges of the plates and in an axial direction with respect to the bowl.

10. In a centrifugal separator, the combination with the bowl, of radially-corrugated division-plates arranged in the liquid-space across the radial lines of the bowl, said plates being held in contact with each other with the corrugations of one plate separate from those of the adjacent plate.

11. In a centrifugal separator, the combination with the bowl, of radially-corrugated, superposed division-plates arranged in the liquid-space across the radial lines of the bowl, said plates being held in contact with each other with the corrugations of one plate engaged within the corrugations of another plate, to separate the several channels formed by the corrugations.

12. In a centrifugal separator, the combination with the bowl, of superposed division-plates arranged in the liquid-space across the radial lines of the bowl and each plate having its inner and outer edges curved upwardly in the direction of the course of the currents and also having apertures intermediate the curved edges, and means for holding the plates separated.

13. In a centrifugal separator, the combination with the bowl, of superposed division-plates arranged in the liquid-space across the radial lines of the bowl and each plate having its inner and outer edges curved upwardly in the direction of the course of the currents and also having apertures intermediate the curved edges, said apertures being formed with downwardly-converged edges, and means for holding the plates separated.

14. In a centrifugal separator, the combination with the bowl, of superposed division-plates arranged in the liquid-space across the radial lines of the bowl and each plate having its inner and outer edges curved upwardly in the direction of the course of the currents and also having apertures intermediate the curved edges, an imperforate baffle-plate at the top of the division-plates, and means for holding the plates separated.

In testimony whereof I have signed my name to this specification in the presence of two subscribing witnesses.

GUSTAF T. RENNERFELT.

Witnesses:
ERIK AUG. LINDBLOM,
JAMES B. CAUTHERS.